(Model.)
S. H. RAYMOND.
NUT LOCK FOR CARRIAGE TOP PROPS.
No. 261,482. Patented July 18, 1882.
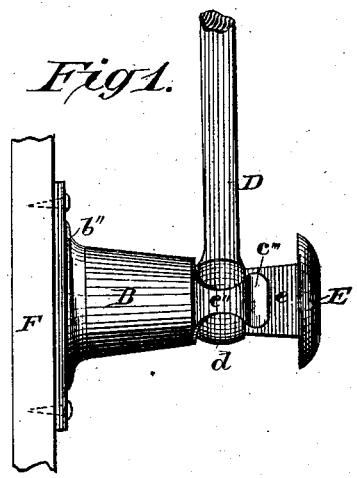
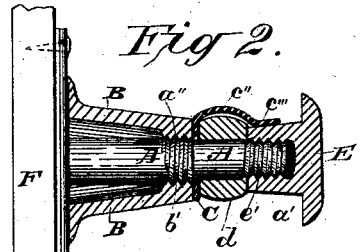
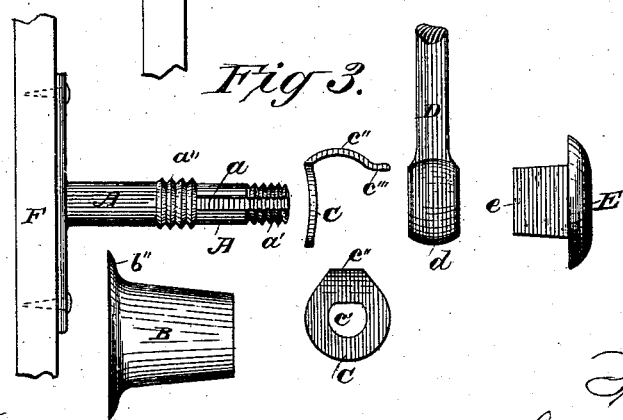
Attest:
Geo. T. Smallwood Jr.
Inventor
Silas H. Raymond
By Knight Bros.
Attys.

UNITED STATES PATENT OFFICE.

SILAS H. RAYMOND, OF SOUTH BEND, INDIANA.

NUT-LOCK FOR CARRIAGE-TOP PROPS.

SPECIFICATION forming part of Letters Patent No. 261,482, dated July 18, 1882.

Application filed May 9, 1882. (Model.)

*To all whom it may concern:*

Be it known that I, SILAS H. RAYMOND, a citizen of the United States, residing at South Bend, in the county of St. Joseph and State of Indiana, have invented a new and useful Improvement in Nut-Locks for Carriage-Top Props, of which the following is a specification.

My invention relates to a nut-lock for securing the nuts of carriage-top joints, whereby they are prevented from becoming detached from the pivot-bolt; and the invention consists of a curved spring-plate attached by its inner end to the pivot-bolt of the top-joint, and so arranged that its outer end shall press upon the sides of the joint-nut and prevent it from becoming detached from the end of the pivot-bolt.

In order that my invention may be fully understood, I will proceed to describe it with reference to the accompanying drawings, making a part of this specification, in which—

Figure 1 is a top view of a top-joint with my improved nut-lock attached. Fig. 2 is a view of the same in vertical section. Fig. 3 is a view of the several parts of the joint detached from their relative positions.

In the said drawings, A represents a cylindrical bolt forming the pivot of the joint, said bolt being provided with a flat plate, A', cast upon its inner end, and having suitable holes formed through it into which a number of bolts or screws are inserted, whereby the bolt is attached to the body of the vehicle, as shown in the drawings, and extending horizontally outward therefrom. This bolt is formed with a flattened upper side, as is shown at $a$ in the drawings, and also with two sets of screw-threads, $a'$ $a''$, one of which is formed on the outer extremity of the bolt, while the other is formed just back of the flattened shank thereof.

B is a hollow conical sleeve provided with an internal screw-thread, $b'$, at its outer portion, and also with a circular flange, $b''$, on its inner end.

C is a spring-plate consisting of the part $c$, formed with a curvature on a line drawn vertically through it, as shown in Fig. 3, and provided with an eye, $c'$, having its upper edge straight, as shown, to correspond to the shape of the bolt. From this part $c'$ the spring-plate extends in the form of an arch, $c''$, and terminates at its outer end in a flattened and laterally-extended portion, $c'''$.

D is the end of the joint, provided with an eye, $d$, formed through a lateral projection on its lower extremity.

E is a nut formed with a square portion, $e$, which is provided with a circular cavity having an internal screw-thread, $e'$, and also with a circular convex head, as shown.

The bolt having been attached to the body F of the vehicle by means of the screws or bolts passing through the part A' of said bolt and entering the body of the vehicle, the sleeve B is first placed upon the bolt A, so as to embrace it, and is securely attached to such bolt by its internal thread, $b'$, which meshes with the thread $a''$ of said bolt. The spring C is then placed in position on the bolt, which passes through its eye $c'$. The end D of the joint is next placed in position on the bolt A, which passes through its eye $d$, and finally the nut E is screwed onto the end of the bolt. As the nut E is screwed firmly on the end of the bolt A it will compress the curved inner part of said spring-plate between the outer end of the sleeve B and the side of the joint end D, thereby forcing the outer end of said plate down upon the sides of the part $e$ of the nut. This would result in the turning of the spring-plate with the continued turning of the nut, but for the peculiar formation of the bolt, consisting of its flattened upper side, $a$, together with the straight edge of the eye $c'$, which, acting together, prevent the plate C from turning. The plate C would also have a tendency to prevent the further turning of the nut E, but for the arch $c''$ of said plate, which permits the part $c$ of the plate to rise as the corners of the nut come in contact with it, and at the same time permits the recoil of the spring, bringing its end $c'''$ down upon the sides of the nut, and when the latter is securely attached in position such pressure causes the end $c'''$ by its pressure to lock the nut, preventing it from becoming detached.

Having thus described my invention, what I claim as new, and desire to secure by Letters Patent, is—

The nut-locking attachment for the top-joints of carriages herein described, consisting of the spring C, provided with the curved portion $c$, with its eye $c'$, having a straight section, as shown, arch $c''$, and laterally-extended portion $c'''$, in combination with the bolt A, provided with the flat portion or depression $a$, and the nut E, with its angular-sided extension $e$, substantially as and for the purposes described.

SILAS H. RAYMOND.

Witnesses:
W. E. MYLER,
HUGO A. PISCHKE.